(12) United States Patent
Leng

(10) Patent No.: US 10,764,119 B2
(45) Date of Patent: Sep. 1, 2020

(54) LINK HANDOVER METHOD FOR SERVICE IN STORAGE SYSTEM, AND STORAGE DEVICE

(71) Applicant: Huawei Technologies Co., Ltd., Shenzhen (CN)

(72) Inventor: Chao Leng, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 46 days.

(21) Appl. No.: 16/189,508

(22) Filed: Nov. 13, 2018

(65) Prior Publication Data

US 2019/0081853 A1 Mar. 14, 2019

Related U.S. Application Data

(63) Continuation of application No. PCT/CN2017/083987, filed on May 11, 2017.

(30) Foreign Application Priority Data

May 13, 2016 (CN) .......................... 2016 1 0319322

(51) Int. Cl.
*H04L 12/24* (2006.01)
*H04L 12/803* (2013.01)
(Continued)

(52) U.S. Cl.
CPC ...... *H04L 41/0668* (2013.01); *H04L 43/0811* (2013.01); *H04L 47/125* (2013.01); *H04L 47/41* (2013.01); *H04L 45/245* (2013.01)

(58) Field of Classification Search
None
See application file for complete search history.

(56) References Cited

U.S. PATENT DOCUMENTS

2003/0016624 A1* 1/2003 Bare ................. H04L 29/12009
370/217
2005/0249123 A1* 11/2005 Finn .................... H04L 41/0677
370/242
(Continued)

FOREIGN PATENT DOCUMENTS

CN 1753376 A 3/2006
CN 1909559 A 2/2007
(Continued)

OTHER PUBLICATIONS

Machine Translation and Abstract of Chinese Publication No. CN1913414, Feb. 14, 2007, 8 pages.
(Continued)

*Primary Examiner* — Brian S Roberts
(74) *Attorney, Agent, or Firm* — Conley Rose, P.C.

(57) ABSTRACT

A storage system including a first controller and a second controller, where the first controller and the second controller each coupled to at least one interface card, and each interface card includes at least one port. A bound port group is preconfigured in the storage system, and the bound port group includes ports from the first controller and the second controller. A link handover method includes when the first controller detects that a link of a first port in the bound port group is faulty, marking a status of the first port as unavailable in the bound port group, selecting a second port in an available state from the bound port group, and handing over a service carried on the link of the first port to a link of the second port.

20 Claims, 9 Drawing Sheets

(51) Int. Cl.
*H04L 12/891* (2013.01)
*H04L 12/26* (2006.01)
*H04L 12/709* (2013.01)

(56) References Cited

U.S. PATENT DOCUMENTS

| | | | |
|---|---|---|---|
| 2007/0112890 A1 | 5/2007 | Murase | |
| 2007/0207591 A1* | 9/2007 | Rahman | H04L 45/00 438/439 |
| 2008/0115126 A1* | 5/2008 | Nakano | G06F 8/65 718/1 |
| 2010/0293200 A1* | 11/2010 | Assarpour | H04L 45/00 707/802 |
| 2013/0173839 A1 | 7/2013 | Li | |
| 2013/0201822 A1* | 8/2013 | Liang | H04L 45/242 370/228 |
| 2014/0211637 A1* | 7/2014 | Sawal | H04L 41/04 370/244 |
| 2017/0289040 A1* | 10/2017 | Sreeramoju | H04L 47/12 |

FOREIGN PATENT DOCUMENTS

| | | |
|---|---|---|
| CN | 1913414 A | 2/2007 |
| CN | 1984039 A | 6/2007 |
| CN | 101252531 A | 8/2008 |
| CN | 102629225 A | 8/2012 |
| CN | 103532856 A | 1/2014 |
| CN | 103684918 A | 3/2014 |
| CN | 104410510 A | 3/2015 |
| CN | 106059791 A | 10/2016 |
| EP | 2770681 A1 | 8/2014 |

OTHER PUBLICATIONS

Machine Translation and Abstract of Chinese Publication No. CN1984039, Jun. 20, 2007, 10 pages.
Machine Translation and Abstract of Chinese Publication No. CN103532856, Jan. 22, 2014, 18 pages.
Foreign Communication From a Counterpart Application, Chinese Application No. 201610319322.1, Chinese Office Action dated Apr. 16, 2019, 6 pages.
Machine Translation and Abstract of Chinese Publication No. CN1753376, Mar. 29, 2006, 19 pages.
Machine Translation and Abstract of Chinese Publication No. CN1909559, Feb. 7, 2007, 16 pages.
Machine Translation and Abstract of Chinese Publication No. CN101252531, Aug. 27, 2008, 14 pages.
Machine Translation and Abstract of Chinese Publication No. CN103684918, Mar. 26, 2014, 18 pages.
Machine Translation and Abstract of Chinese Publication No. CN104410510, Mar. 11, 2015, 28 pages.
Machine Translation and Abstract of Chinese Publication No. CN106059791, Oct. 26, 2016, 30 pages.
Foreign Communication From a Counterpart Application, Chinese Application No. 201610319322.1, Chinese Office Action dated Aug. 29, 2018, 5 pages.
Foreign Communication From a Counterpart Application, Chinese Application No. 201610319322.1, Chinese Search Report dated Aug. 13, 2018, 2 pages.
Foreign Communication From a Counterpart Application, PCT Application No. PCT/CN2017/083987, English Translation of International Search Report dated Jul. 28, 2017, 2 pages.
Foreign Communication From A Counterpart Application, PCT Application No. PCT/CN2017/083987, English Translation of Written Opinion dated Jul. 28, 2017, 7 pages.

* cited by examiner

```
┌─────────────────────────────────────────────────┐
│ A primary controller groups a plurality of ports from │ ⟋ S201
│   different controllers into a bound port group       │
└─────────────────────────────────────────────────┘
                        │
┌─────────────────────────────────────────────────┐
│  The primary controller generates bound port group   │ ⟋ S202
│                     information                       │
└─────────────────────────────────────────────────┘
                        │
┌─────────────────────────────────────────────────┐
│ (Optional) The primary controller sends the bound port│ ⟋ S203
│   group information to the different controllers      │
└─────────────────────────────────────────────────┘
                        │
┌─────────────────────────────────────────────────┐
│ (Optional) The different controllers each locally store│⟋ S204
│          the bound port group information             │
└─────────────────────────────────────────────────┘
```

FIG. 2A

| | | | |
|---|---|---|---|
| Identifier of a bound port group | P1 | | |
| MAC address of a bound port group | MAC A | | |
| IP address of a bound port group | IP1 | | |
| Attached port of a bound port group | Controller A | A1 | A2 |
| | Controller B | B1 | B2 |
| | Controller C | C1 | C2 |
| | Controller D | D1 | D2 |
| Status of a link corresponding to an attached port | A1: Normal | | A2: Normal |
| | B1: Normal | | B2: Normal |
| | C1: Normal | | C2: Normal |
| | D1: Faulty | | D2: Normal |
| Working status of an attached port | A1: Available | | A2: Available |
| | B1: Available | | B2: Available |
| | C1: Available | | C2: Available |
| | D1: Unavailable | | D2: Available |

FIG. 2B

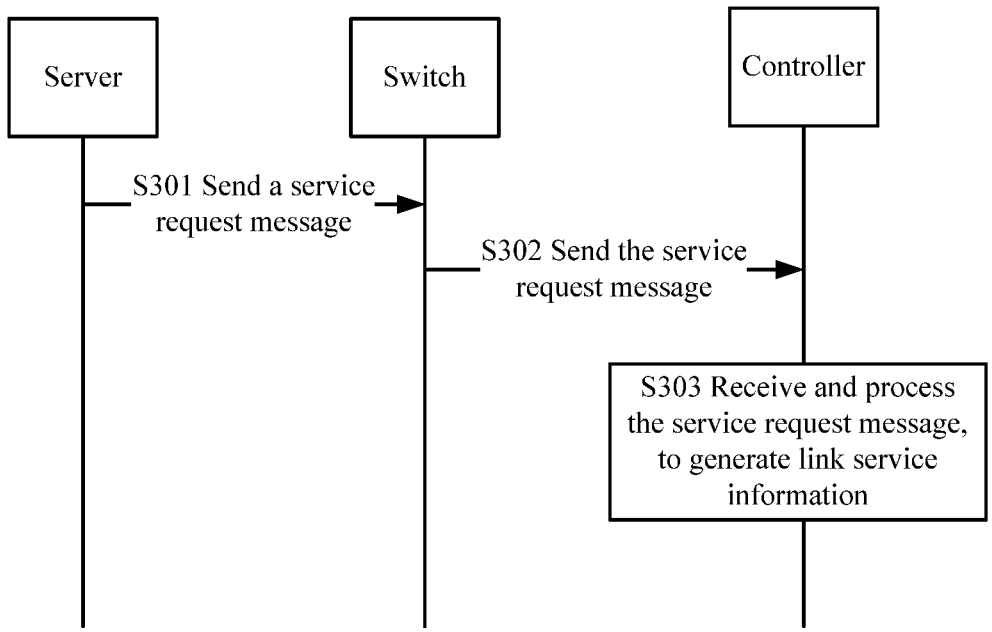

FIG. 3A

| Working controller identifier | A |
|---|---|
| Identifier of a bound port group | P1 |
| Attached port of a bound port group | A1 |

When it is detected that a link of a first port in a bound port group is faulty, mark a working status of the first port as unavailable — S410

Select a second port that is in an available state from the bundled port group, and hand over a service carried on the link of the first port to a link of the second port — S420

FIG. 4

LINK HANDOVER METHOD FOR SERVICE IN STORAGE SYSTEM, AND STORAGE DEVICE

CROSS-REFERENCE TO RELATED APPLICATIONS

This application is a continuation of International Patent Application No. PCT/CN2017/083987 filed on May 11, 2017, which claims priority to Chinese Patent Application No. 201610319322.1 filed on May 13, 2016. The disclosures of the aforementioned applications are hereby incorporated by reference in their entireties.

TECHNICAL FIELD

The present disclosure relates to the storage field, and in particular, to a link handover method for a service in a storage system, and a storage device.

BACKGROUND

With the rapid development of network application, a growing number of users face a problem of network link stability. A most direct way to resolve this problem is to provide a link redundancy function in a system using a link aggregation technology.

In the link aggregation technology, the Link Aggregation Control Protocol (LACP) is mainly used. The LACP is a protocol that is proposed based on the Institute of Electrical and Electronics Engineers (IEEE) 802.3ad standard to implement dynamic link aggregation. Both parties of communication exchange information with a peer device using an LACP data unit (LACPDU) to perform dynamic link aggregation and disaggregation, thereby implementing dynamic redundancy backup.

In other approaches, a storage device aggregates links in a controller using the LACP. That is, the storage device binds a group of ports in a same controller together into one logical port, to form an aggregated link between the controller and a switch. That is, communications links between the switch and all ports in the group of ports are aggregated into one logical link, and in a data transmission process, a redundant path is handed over according to a status of each physical link. When a port in the group of ports is faulty, the controller can quickly perceive that the port is faulty, and use a physical link of another port to carry a service. However, if the controller is faulty, all physical links between the controller and the switch are disconnected, and therefore there is no redundant path any more. Therefore, in the other approaches, when a single point of failure occurs on the controller of the storage device, a service link corresponding to a port of the controller is faulty, and the service is forced into interruption.

SUMMARY

Embodiments of the present disclosure provide a link handover method for a service in a storage system, and a storage device. When a link is faulty, a service carried on the link may be handed over such that the service is not interrupted.

To achieve the foregoing objectives, the following technical solutions are used in the present disclosure.

According to a first aspect, a link handover method for a service in a storage system is provided, where the storage system includes a first controller and a second controller, where the first controller and the second controller each are connected to at least one interface card, and each interface card includes at least one port, a bound port group is preconfigured in the storage system, and the bound port group includes ports from the first controller and the second controller, and the method includes marking a status of the first port as unavailable if the first controller detects that a link of a first port in the bound port group is faulty, and selecting, by the first controller, a second port that is in an available state from the bound port group, and handing over the service carried on the link of the first port to a link of the second port.

Further, bound port group information of the bound port group is stored in the storage system. The bound port group information may include an identifier of the bound port group, used to distinguish and identify the bound port group, attached ports of the bound port group, that is, a plurality of ports that are from at least two controllers and that are included in the bound port group, a working status of an attached port, used to indicate a status of each attached port, such as available or unavailable, a status of a link corresponding to an attached port, used to indicate a status of a link corresponding to each attached port, such as normal or faulty, a media access control (MAC) address of the bound port group, and an Internet Protocol (IP) address of the bound port group.

Herein, the marking a status of the first port as unavailable includes changing, in the bound port group information, a working status of the first port to unavailable, and further changing a status of the link corresponding to the first port to faulty.

The bound port group information may be stored in the storage system as global information such that in a subsequent service deployment process, all the controllers in the storage system can view and modify the bound port group information, for example, when a working status of an attached port in the bound port group changes, or a status of a link corresponding to an attached port changes.

In order to reduce coupling between the controllers in the storage system, improve processing efficiency of the controllers, and reduce a delay of communication between the controllers, the bound port group information may alternatively be separately locally stored in different controllers to which the attached ports in the bound port group belong. In this way, in the subsequent service deployment process, the different controllers to which the attached ports belong may directly locally query and modify the bound port group information.

In a first possible implementation of the first aspect, the method further includes that the first port belongs to the first controller, and that the first controller detects that a link of a first port is faulty includes determining that the link of the first port is faulty if the first controller detects that the first port is faulty or detects that an interface card to which the first port belongs is faulty.

In a second possible implementation of the first aspect, the method further includes that the first port belongs to the first controller, and that the first controller detects that a link of a first port is faulty includes determining that the link of the first port is faulty if the first controller receives no link status information from a peer switch within a predefined time threshold.

In a third possible implementation of the first aspect, the method further includes that the first port belongs to the second controller, and that the first controller detects that a link of a first port is faulty includes determining that the link of the first port is faulty if the first controller detects that the second controller is faulty.

In a fourth possible implementation of the first aspect, the method further includes randomly selecting, by the first controller, a port that is currently in an available state from the bound port group as the second port.

In a fifth possible implementation of the first aspect, the method further includes selecting, by the first controller from the bound port group and as the second port, a port that is currently in an available state and belongs to a same interface card as the first port, if the bound port group has no port that is currently in an available state and belongs to a same interface card as the first port, selecting, by the first controller as the second port, a port that is currently in an available state and belongs to a same controller as the first port, or if the bound port group has neither a port that is currently in an available state and belongs to a same interface card as the first port nor a port that is currently in an available state and belongs to a same controller as the first port, selecting, by the first controller, a port that is currently in an available state and has lightest service load from the bound port group as the second port.

With reference to the first aspect to the fifth possible implementation of the first aspect, in a sixth possible implementation of the first aspect, in the storage system, the first controller and the second controller belong to a same storage device.

With reference to the first aspect to the fifth possible implementation of the first aspect, in a seventh possible implementation of the first aspect, in the storage system, the first controller and the second controller belong to different storage devices.

According to the foregoing described method, when the link of the first port in the bound port group is faulty, the second port that is in an available state may be selected from the bound port group, and the link of the second port is used to carry the service carried on the first port. In this method, the bound port group includes the plurality of ports from the different controllers. In this way, regardless of a fault of a port, a fault of an interface card, a fault of a switch side port, or a fault of a controller, the second port can be selected from the bound port group, and the service originally carried on the link of the first port is handed over to the link of the second port such that the service can be continued, thereby improving service reliability of the entire storage system.

According to a second aspect, a storage device is provided, where the storage device includes a first controller and a second controller, where the first controller and the second controller each are connected to at least one interface card, and each interface card includes at least one port, and the first controller includes a configuration unit, a detection unit, and a handover unit, where the configuration unit is configured to preconfigure a bound port group, where the bound port group includes ports from the first controller and the second controller, the detection unit is configured to mark a status of a first port as unavailable when detecting that a link of the first port is faulty, and the handover unit is configured to select a second port that is in an available state from the bound port group, and hand over a service carried on the link of the first port to a link of the second port.

Optionally, when the first port belongs to the first controller, if the detection unit detects that the first port is faulty or detects that an interface card to which the first port belongs is faulty, the detection unit determines that the link of the first port is faulty.

Optionally, when the first port belongs to the first controller, the detection unit is further configured to determine that the link of the first port is faulty when the first controller receives no link status information from a peer switch within a predefined time threshold.

Optionally, when the first port belongs to the second controller, the detection unit is further configured to determine that the link of the first port is faulty when detecting that the second controller is faulty.

According to a third aspect, a storage device is provided, including a first controller, a second controller, a memory, a communications interface, and a bus, where the first controller, the second controller, the memory, and the communications interface are connected using the bus, the memory is configured to store an operating system and a program, and the program includes an instruction used to perform the method in any one of the first aspect or the possible implementations of the first aspect. The first controller and the second controller are configured to execute the instruction in the memory, and when the first controller or the second controller executes the instruction stored in the memory, the execution enables the first controller or the second controller to perform the method in any one of the first aspect or the possible implementations of the first aspect.

According to a fourth aspect, a computer readable medium is provided, and is used to store a computer program, where the computer program includes an instruction used to perform the method in any one of the first aspect or the possible implementations of the first aspect.

According to the foregoing described method and storage device, when the link of the first port in the bound port group is faulty, the second port that is in an available state may be selected from the bound port group, and the link of the second port is used to carry the service carried on the first port. The bound port group includes the plurality of ports from the different controllers. In this way, regardless of a fault of a port, a fault of an interface card, a fault of a switch side port, or a fault of a controller, the second port can be selected from the bound port group, and the service originally carried on the link of the first port is handed over to the link of the second port such that the service can be continued, thereby improving service reliability of the entire storage system.

BRIEF DESCRIPTION OF DRAWINGS

FIG. 2A is a schematic diagram of a procedure of creating a bound port group according to an embodiment of the present disclosure;

FIG. 2B is a schematic diagram of a data structure for storing bound port group information according to an embodiment of the present disclosure;

FIG. 3A is a flowchart of service processing according to an embodiment of the present disclosure;

FIG. 3B is a schematic diagram of a data structure for storing link service information according to an embodiment of the present disclosure;

FIG. 4 is a schematic flowchart of a link handover method 400 for a service in a storage system according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1A:
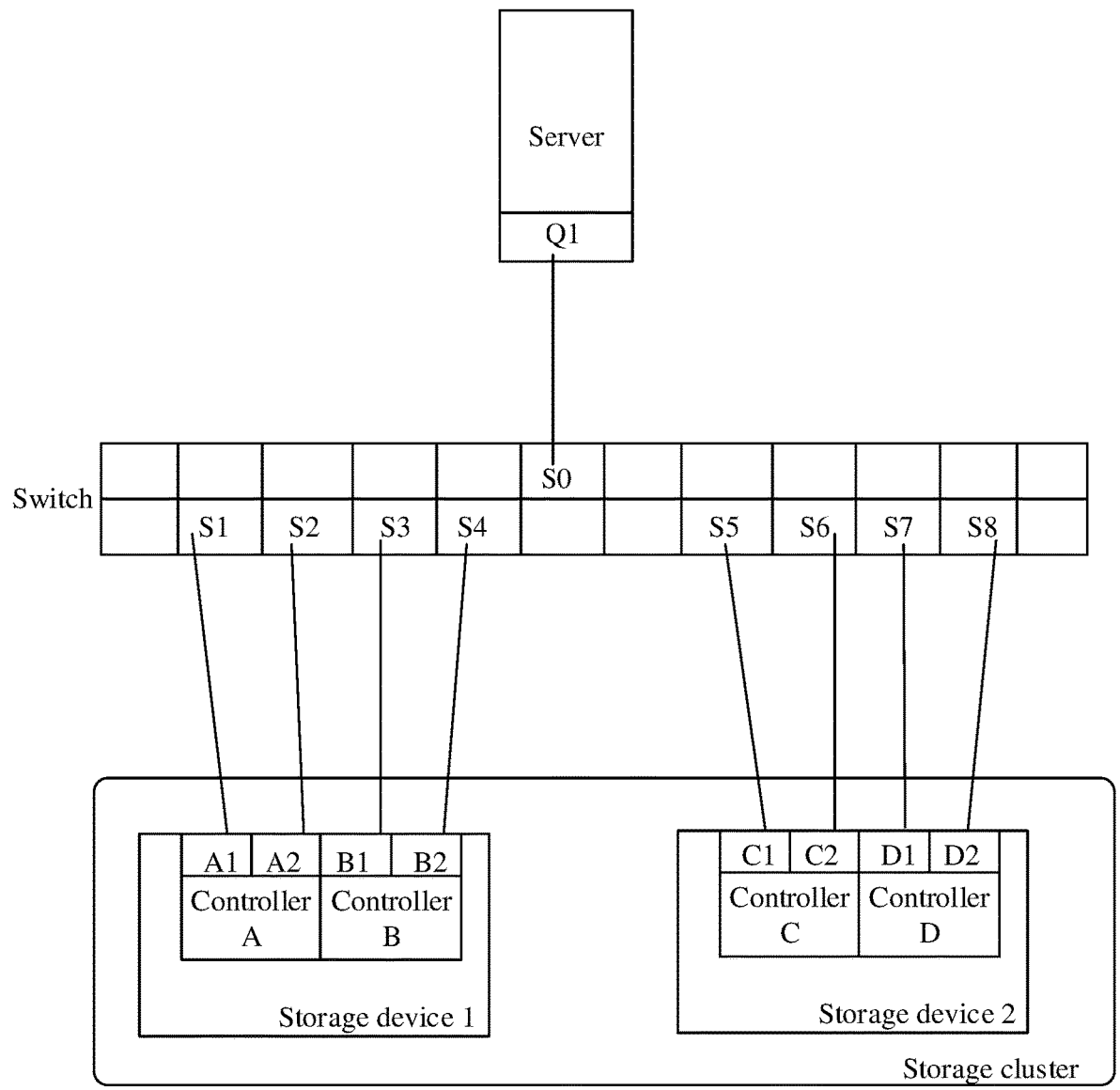
FIG. 1A is a schematic diagram of a storage system according to an embodiment of the present disclosure.
Figure 1B:
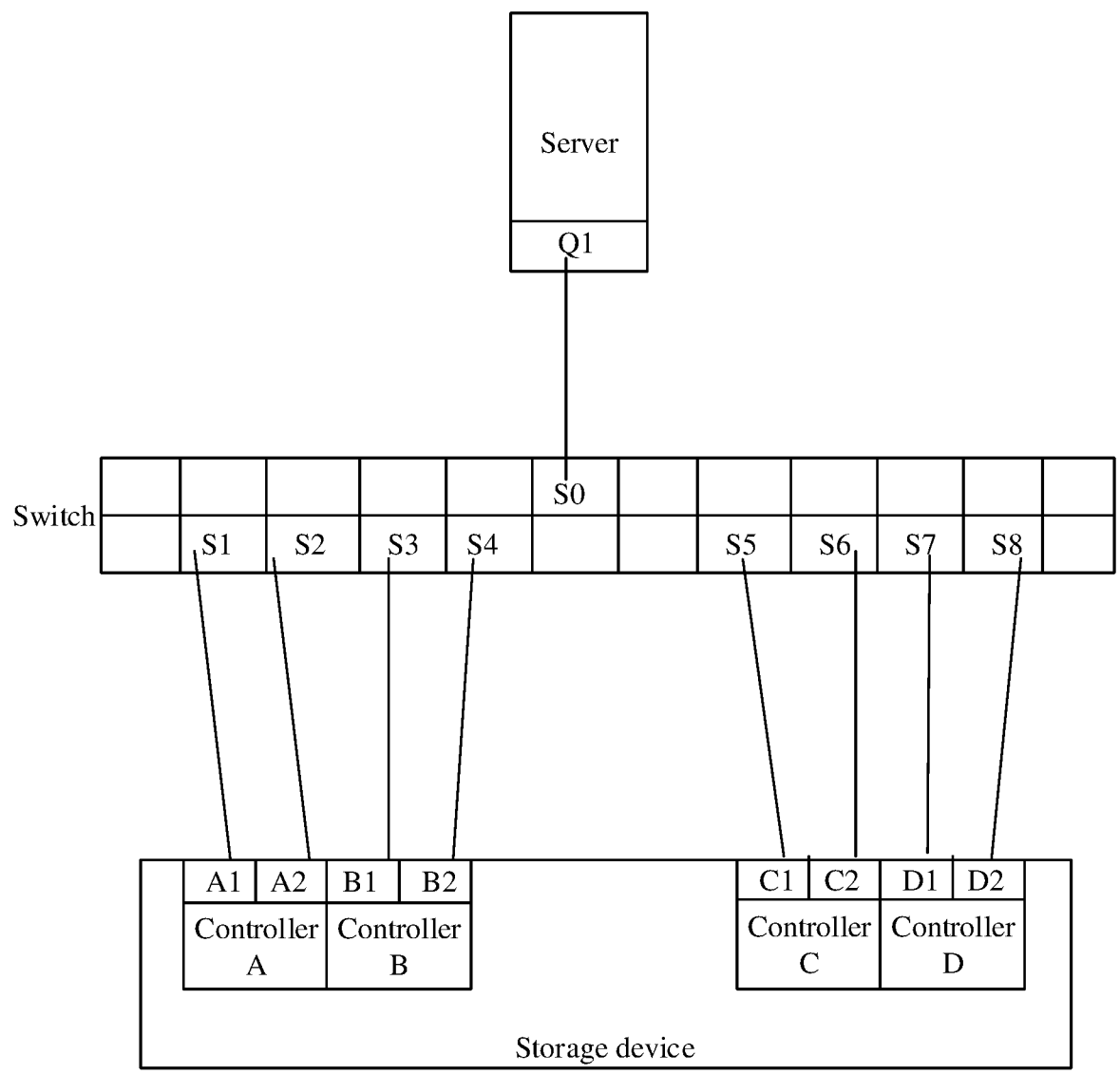
FIG. 1B is a schematic diagram of a storage device according to an embodiment of the present disclosure.

The embodiments of the present disclosure provide a link handover method for a service in a storage system. The method is applied to the storage system. The storage system may be a storage cluster system including two or more storage devices. Each storage device includes at least one controller, each controller is connected to at least one interface card such as a host bus adapter (HBA) card, each interface card includes at least one port, and the controller communicates with another entity such as a switch or a server using the port. FIG. 1A is a schematic diagram of a storage system. The storage system is a storage cluster system including a storage device 1 and a storage device 2. The storage device 1 includes a controller A and a controller B that communicate with a switch and a server respectively using ports A1 and A2 and ports B1 and B2. The storage device 2 includes a controller C and a controller D that communicate with the switch and the server respectively using ports C1 and C2 and ports D1 and D2 (an interface card is not shown in the figure). A person skilled in the art may understand that the controller implements communication between the controller and the switch by establishing a communications link between a port included in the controller and a port of the switch. For example, the controller A and the controller B establish an inter-port link between each of the ports A1, A2, B1, and B2 and each of ports S1, S2, S3, and S4 of the switch. Likewise, the switch establishes a communications link with a port Q1 of the server using a port S0. In this way, the storage device 1 can communicate with the switch and the server. The embodiments of the present disclosure may also be applied to a storage system including one storage device, and the storage device includes two or more controllers. As shown in FIG. 1B, the storage device includes four controllers, each controller is connected to one interface card (the interface card is not shown in the figure), each interface card includes two ports, and the storage device communicates with a peer device such as a switch or a server using the ports included in the interface card. The embodiments of the present disclosure are further described below in detail using the application scenario shown in FIG. 1A.

In the embodiments provided in the present disclosure, a plurality of ports need to be grouped into a bound port group in advance in the storage system. Herein, the plurality of ports are from different controllers, communications links corresponding to all the ports in the bound port group (that is, a communications link between the port and a port of a peer switch) form a logical aggregated link, and the controllers communicate with the peer switch using the aggregated link. In an example shown in FIG. 1C, all ports of all controllers in the storage system form a bound port group.

A method for creating a bound port group is shown in FIG. 2A, and the method includes the following steps.

Step S201. A primary controller groups a plurality of ports from different controllers into a bound port group.

In the storage system shown in FIG. 1A, the primary controller is responsible for creating the bound port group. The primary controller may be any one of the four controllers included in the storage system, for example, may be a controller with a smallest controller identifier (that is, the controller A). This is not limited in this embodiment of the present disclosure. In addition, a person skilled in the art may understand that when an original primary controller is faulty, the storage system may automatically select another controller as a new primary controller.

Figure 1C:
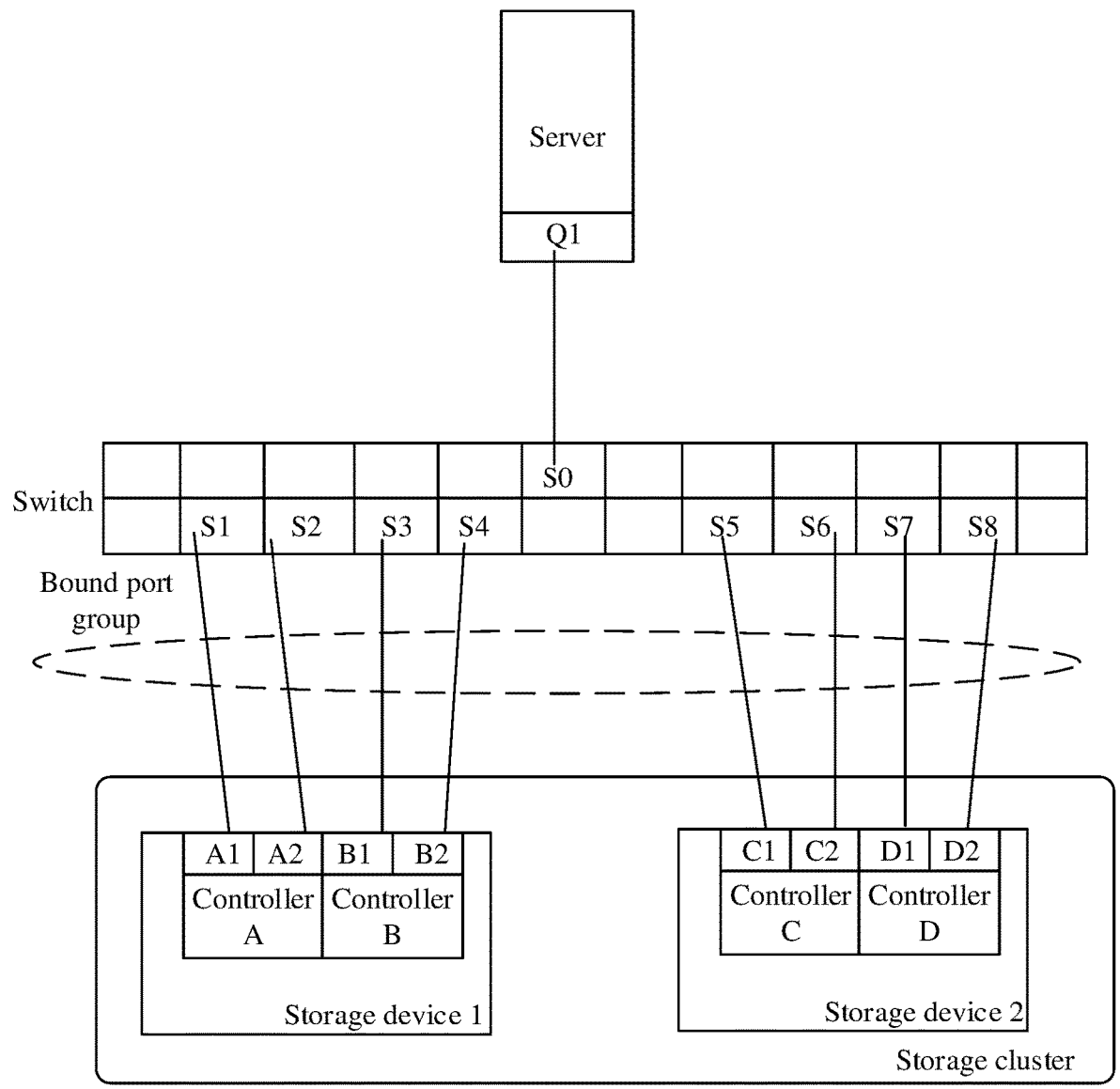
FIG. 1C is a schematic diagram of implementing a bound port group according to an embodiment of the present disclosure.

When creating the bound port group, the primary controller groups the plurality of ports of the different controllers into one bound port group, and the plurality of ports are attached ports of the bound port group. As shown in FIG. 1C, all ports of all the controllers in the storage system are grouped into one bound port group. Certainly, a plurality of bound port groups may be created according to service requirements, each bound port group includes at least two ports, and the at least two ports are from different controllers. It should be specified that at a moment, a port of a controller can exist in only one bound port group, and cannot be included in a plurality of bound port groups.

Step S202. The primary controller generates bound port group information.

The bound port group information may include an identifier of the bound port group, used to distinguish and identify the bound port group, attached ports of the bound port group, that is, a plurality of ports that are from at least two controllers and that are included in the bound port group, a working status of an attached port, used to indicate a status of each attached port, such as available or unavailable, a status of a link corresponding to an attached port, used to indicate a status of a link corresponding to each attached port, such as normal or faulty, a MAC address of the bound port group, and an IP address of the bound port group.

Optionally, the bound port group information may further include a virtual local area network (VLAN) of the bound port group, and link statistics information of an attached port, used to record working link information of each attached port.

FIG. 2B is a schematic diagram of a data structure for storing bound port group information according to an embodiment of the present disclosure. A person skilled in the art may understand that in actual application, various data structures may be flexibly used according to service requirements to record the bound port group information, and all the data structures fall within the protection scope of the present disclosure. The data structure is not limited in the present disclosure.

Optionally, the primary controller checks validity of an attached port in a process of creating the bound port group, that is, checks whether the attached port has joined another bound port group, and checks validity of the MAC address and the IP address of the bound port group.

After the bound port group information is generated, the bound port group information may be stored as global information in the storage system. In this way, in a subsequent service deployment process, all the controllers in the storage system can view and modify the bound port group information, for example, when a working status of an attached port in the bound port group changes, or a status of a link corresponding to an attached port changes.

Step S203. (Optional) The primary controller sends the bound port group information to the different controllers.

Step S204. (Optional) The different controllers each locally store the bound port group information.

In order to reduce coupling between the controllers in the storage system, improve processing efficiency of the controllers, and reduce a delay of communication between the controllers, the primary controller may alternatively separately send the bound port group information to the different controllers to which the attached ports in the bound port group belong, and the different controllers each locally store the bound port group information. In this way, in the subsequent service deployment process, the controllers can directly locally query and modify the bound port group information.

A person skilled in the art may understand that after the primary controller creates the bound port group, based on an LACP technology, a controller to which each attached port in the bound port group belongs sends an LACPDU to a peer switch using the attached port, to notify the peer switch of information such as a system priority, a port priority, a port number, and an operation key value of the controller. After negotiation, a communications link established between each attached port in the bound port group created by the primary controller and a corresponding port of the switch is aggregated into one logical aggregated link. This specific implementation process is the other approaches of LACP, and details are not described herein.

After the primary controller creates the bound port group, and negotiates with the peer switch, the storage system can implement data transmission of a service with the peer switch and a server based on the aggregated link of the bound port group. As shown in FIG. 3A, the following steps are included.

Step S301. The server sends a service request message to the switch.

In a service deployment process, the server sends the service request message to the storage system. The service request message may be a read request, may be a write request, or may be a service related message of another type, and this is not limited in the present disclosure.

Step S302. The switch sends the service request message to a controller.

In this embodiment of the present disclosure, after the switch receives the service request message from the server, if the switch confirms that the bound port group is created between the switch and the storage system based on the foregoing embodiment and the aggregated link is established, the switch may select, using a hash algorithm, a communications link from the aggregated link according to a MAC address and an IP address of the server that are carried in the service request message, and send the service request message to the controller of the storage system. Herein, the controller is a controller to which a port corresponding to the communications link belongs.

Step S303. The controller receives and processes the service request message to generate link service information.

After it is specified that a specific communications link is used to carry a service corresponding to the service request message, the controller generates the link service information. The link service information may include a working controller identifier, indicating a controller selected to process the service, that is, the controller to which the port corresponding to the communications link belongs, an identifier of the bound port group, that is, an identifier of the specific bound port group that carries the service, that is, an identifier of the bound port group to which the port of the communications link belongs, and an attached port of the bound port group, that is, a controller side port corresponding to the communications link used to carry the service, where the port belongs to the bound port group.

Further, the link service information may include any one or more of information such as communication four-tuple information, network transport layer information, an application layer protocol identifier, application layer service information, or a timestamp.

In this embodiment of the present disclosure, the link service information is updated when a new service starts or a link of any existing service changes.

FIG. 3B is a schematic diagram of a data structure for recording and storing link service information. A person skilled in the art may understand that in actual application, various data structures may be flexibly used according to service requirements to record the link service information, and all the data structures fall within the protection scope of the present disclosure. The data structure is not limited in the present disclosure.

With reference to content described in FIG. 1A to FIG. 3B, the foregoing embodiments describe that in the cluster storage system that includes a plurality of storage devices, or in a storage system that includes a storage device including at least two controllers, the bound port group including the plurality of ports from the different controllers is created, and communications links corresponding to the plurality of ports from the different controllers in the bound port group are aggregated into one logical aggregated link, to provide a service. In a service deployment process, a communications link may fail to provide a service because a port, an interface card, a controller, or a port of a switch is faulty. In this case, a port may be reselected from the bound port group, and a communications link corresponding to the port may be used to carry the service such that the service can be continued in any one of the foregoing fault scenarios, thereby further improving reliability of the service.

FIG. 4 is a schematic flowchart of a link handover method 400 for a service in a storage system according to an embodiment of the present disclosure. The method 400 includes the following steps.

Step S410. When it is detected that a link of a first port in a bound port group is faulty, mark a working status of the first port as unavailable.

In this embodiment of the present disclosure, a first controller detects that the link corresponding to the first port in the bound port group is faulty. Further, the link of the first port may be faulty in the following several fault scenarios, a fault of the first port, a fault of an interface card at which the first port is located, or a fault of a switch side port connected to the first port. In these scenarios, the first controller, that is, a controller to which the first port belongs, can directly detect a specific fault and determine that the link of the first port is faulty.

In addition, if the controller to which the first port belongs is faulty, the link of the first port may also be faulty. In this scenario, the first controller is a controller that is in a communication relationship with the controller to which the first port belongs.

When detecting that the link of the first port is faulty, the first controller marks a status of the first port as unavailable in bound port group information.

Step S420. Select a second port that is in an available state from the bound port group, and hand over a service carried on the link of the first port to a link of the second port.

In this embodiment of the present disclosure, the first controller may randomly select a port from attached ports that are currently in an available state in the bound port group as the second port, and hand over the service originally carried on the link corresponding to the first port to the link corresponding to the second port. The first controller may alternatively select, according to a best match rule, a port from the attached ports that are currently in an available state as the second port. The best match rule may be rule A, where if there is a port in the attached ports that are currently in an available state in the bound port group, and the port and the first port belong to a same interface card, the port is selected as the second port, or rule B, where when there is no attached port meeting the rule A, if there is a port in the attached ports that are currently in an available state in the bound port group, and the port and the first port belong to a same controller, the port is selected as the second port, or rule C, where if there is neither an attached port meeting the rule A nor an attached port meeting the rule B, an attached port that has lightest service load is selected from the attached ports that are currently in an available state in the bound port group as the second port.

Further, in the rule A, if it is found that the bound port group currently has a plurality of attached ports that are in an available state and belong to a same interface card as the first port, an attached port may be randomly selected from the plurality of attached ports as the second port, or an attached port that has lightest service load is selected as the second port. Likewise, in the rule B, if it is found that the bound port group currently has a plurality of attached ports that are in an available state and belong to a same controller as the first port, an attached port may be randomly selected from the plurality of attached ports as the second port, or an attached port that has lightest service load is selected as the second port.

According to the foregoing described method 400, when the link of the first port in the bound port group is faulty, the second port that is in an available state may be selected from the bound port group, and the link of the second port is used to carry the service carried on the first port. In this embodiment of the present disclosure, the bound port group includes a plurality of ports from different controllers. In this way, even if a controller is faulty, the second port from another controller can be selected from the bound port group, to carry the service originally carried on the first port, thereby improving service reliability of the entire storage system.

With reference to a specific fault scenario, the following describes a link handover method for a service in a storage system according to an embodiment of the present disclosure.

Figure 5:
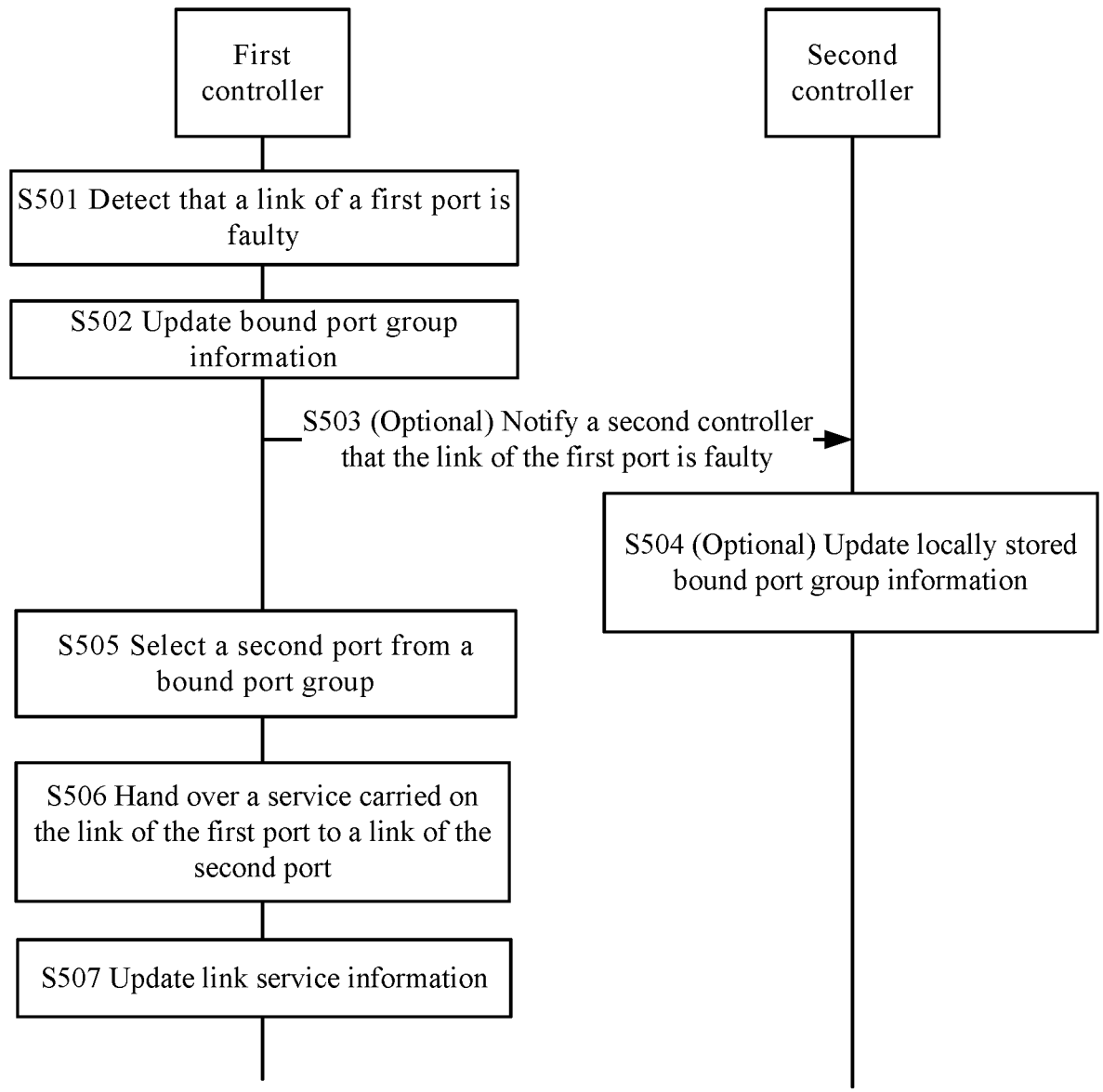
FIG. 5 is a flowchart of a link handover method for a service according to an embodiment of the present disclosure.

As shown in FIG. 5, this scenario is a link fault of a first port caused when the first port is faulty or an interface card to which the first port belongs is faulty. In this scenario, the method includes the following steps.

Step S501. A first controller detects that a link of a first port is faulty.

When the first port is faulty or an interface card to which the first port belongs is faulty, a controller to which the first port or the interface card belongs, that is, the first controller, can directly detect the fault. Therefore, the first controller determines that the link of the first port is faulty. It should be noted that, how the first controller detects whether an interface card or a port included in the first controller is faulty is the other approaches, and details are not described in this embodiment.

Step S502. The first controller updates bound port group information.

That the first controller updates bound port group information includes changing a working status of the first port to unavailable, and further changing a status of the link corresponding to the first port to faulty. Optionally, the first controller may generate a node status change event when detecting that the first port is faulty or the interface card to which the first port belongs is faulty. The node status change event is used to indicate that the first port is faulty or the interface card to which the first port belongs is faulty. When updating the bound port group information, the first controller may change, according to the node status change event, the working status of the first port to unavailable, and change the status of the link corresponding to the first port to faulty.

Step S503. (Optional) The first controller notifies a second controller that the link of the first port is faulty.

Step S504. (Optional) The second controller updates locally stored bound port group information.

In this embodiment of the present disclosure, steps S503 and S504 are optional steps. Further, if the bound port group information is globally stored, only the first controller needs to perform updating, and steps S503 and S504 do not need to be performed, or if the bound port group information is locally stored by a controller to which each attached port in the bound port group belongs, steps S503 and S504 are performed. The second controller is a controller other than the first controller in controllers to which attached ports in the bound port group belong, and there may be one or more second controllers. The first controller notifies the second controller that the link of the first port is faulty. For example, the first controller may send a link change event to the second controller, and the link change event is used to indicate that the link of the first port is faulty. The second controller changes, in the locally stored bound port group information according to the link change event, the working status of the first port to unavailable, and changes the status of the link corresponding to the first port to faulty.

Step S505. The first controller selects a second port from the bound port group.

The first controller may determine, according to a record of the bound port group information, an attached port that is currently in an available state. If there is only one attached port that is currently in an available state, the first controller directly uses the attached port as the second port. If there are a plurality of attached ports that are currently in an available state, the first controller may randomly select an attached port as the second port, or may select the second port according to the best match rule recorded in the embodiment shown in FIG. 4.

Step S506. The first controller hands over a service carried on the link of the first port to a link of the second port.

Step S507. The first controller updates link service information.

That the first controller updates link service information of the service carried on the link of the first port includes updating a working controller identifier in the link service information to an identifier of a controller to which the second port belongs, and updating an attached port in the bound port group to the second port.

In this scenario, when the first port is faulty or the interface card to which the first port belongs is faulty, the second port that is in an available state may be selected from the bound port group, and the link of the second port is used to carry the service carried on the first port, thereby improving service reliability of an entire storage system.

Figure 6:
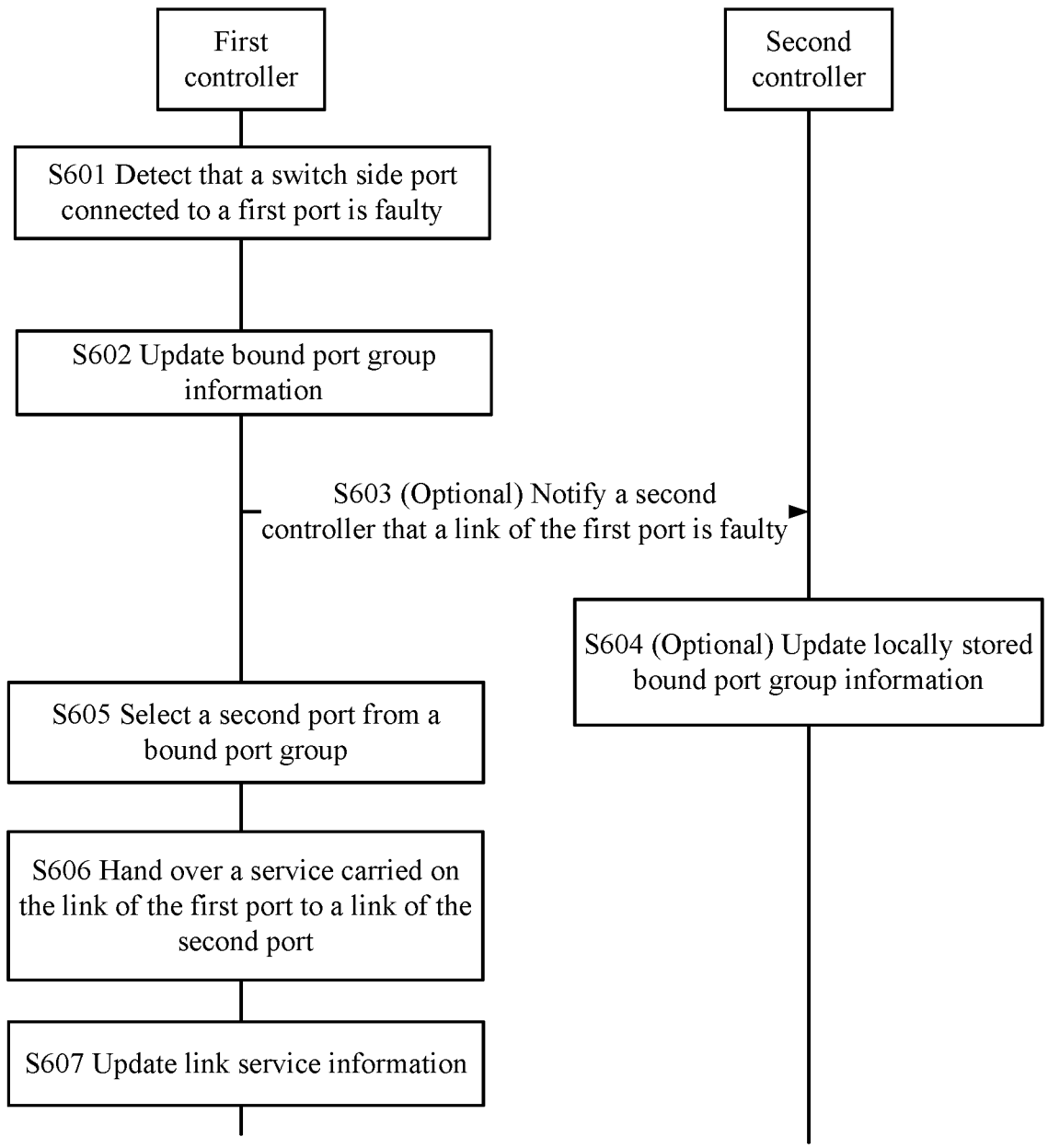
FIG. 6 is a flowchart of another link handover method for a service according to an embodiment of the present disclosure.

FIG. 6 is a flowchart of link handover performed when a switch side port, connected to a port, in a bound port group is faulty or a physical link in a bound port group is faulty. As shown in the figure, the method includes the following steps.

Step S601. A first controller detects that a switch side port connected to a first port is faulty.

After a relationship of a bound port group is formed, an aggregated link is formed between a port of a controller and a peer port of a switch, and the switch periodically notifies the controller of link status information of the switch according to a predefined time threshold. The predefined time threshold may be 10 s or any other specified value, and is not limited in this embodiment of the present disclosure. When the switch side port connected to the first port is faulty or a physical link between the first port and the switch side port is faulty, a controller to which the first port belongs, that is, the first controller, cannot receive the link status information from the switch within the predefined time threshold, and the first controller determines that a link corresponding to the first port is faulty. It should be noted that a process in which the switch regularly notifies the controller of a link status of the switch according to the predefined time threshold is the other approaches, and details are not described in this embodiment.

Step S602. The first controller updates bound port group information.

That the first controller updates bound port group information includes changing a working status of the first port to unavailable, and further changing a status of the link corresponding to the first port to faulty. Optionally, the first controller may generate a switch port link change event when detecting that the switch side port connected to the first port is faulty. The switch port link change event is used to indicate that a link of the switch side port connected to the first port is faulty. When updating the bound port group information, the first controller may change, according to the switch port link change event, the working status of the first port to unavailable, and change the status of the link corresponding to the first port to faulty.

Step S603. (Optional) The first controller notifies a second controller that a link of the first port is faulty.

Step S604. (Optional) The second controller updates locally stored bound port group information.

In this embodiment of the present disclosure, steps S603 and S604 are optional steps. Further, the bound port group information may be globally stored, or may be locally stored by a controller to which each attached port belongs. A specific implementation process of steps S603 and S604 is the same as content described in steps S503 and S504, and details are not described herein again.

Step S605. The first controller selects a second port from a bound port group.

Step S606. The first controller hands over a service carried on the link of the first port to a link of the second port.

Step S607. The first controller updates link service information.

A processing process in step S605 to step S607 is the same as content described in a method for selecting the second port and updating of the link service information in step S505 to step S507, and details are not described herein again.

According to the foregoing descriptions in step S601 to step S607, in this scenario, when the switch side port connected to the first port is faulty or the physical link between the first port and the switch side port is faulty, the second port that is in an available state may be selected from the bound port group, and the link of the second port is used to carry the service carried on the first port, thereby improving service reliability of an entire storage system.

Figure 7:
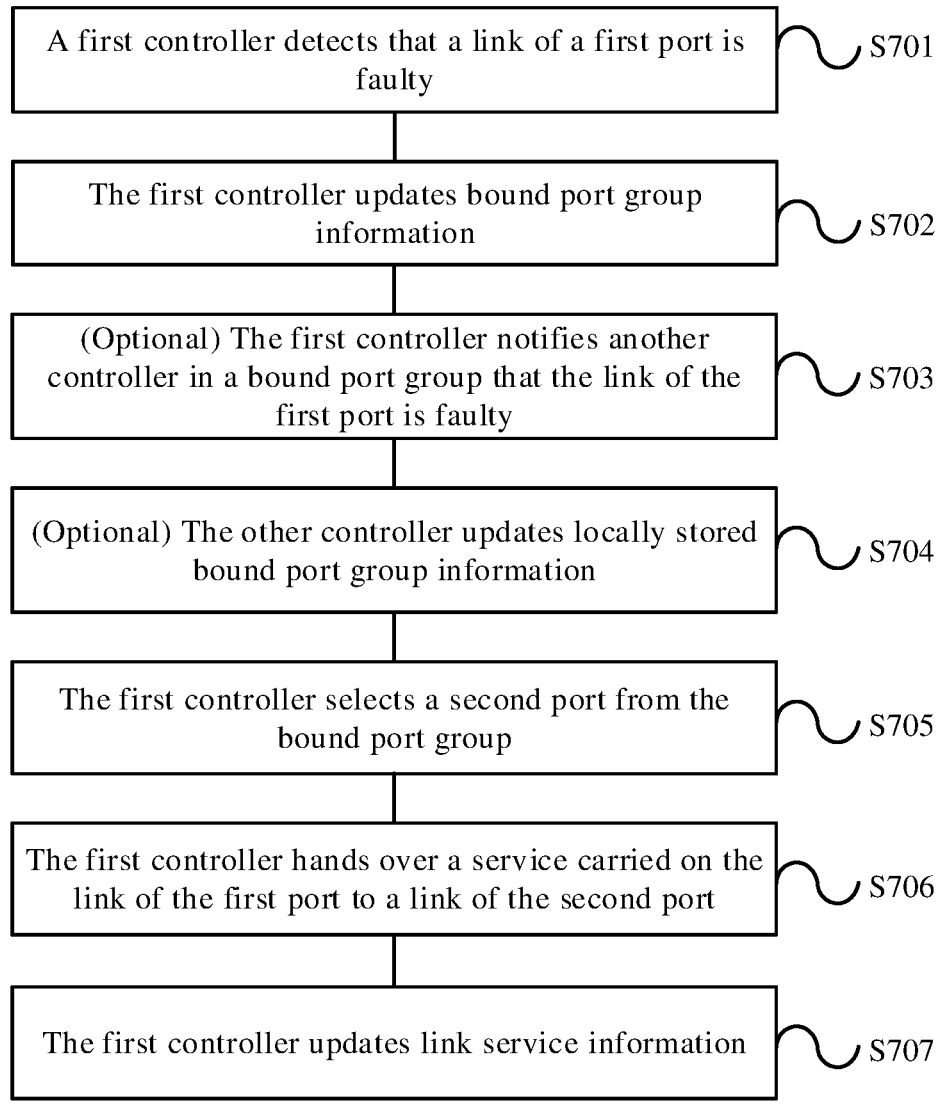
FIG. 7 is a flowchart of another link handover method for a service according to an embodiment of the present disclosure.

In another specific embodiment, if a controller to which a first port belongs is faulty, a link of the first port is faulty. FIG. 7 is a flowchart of link handover method in this scenario. As shown in the figure, the link handover method includes the following steps.

Step S701. A first controller detects that a link of a first port is faulty.

In this embodiment, the first port belongs to a second controller, and the first controller and the second controller are in a communication relationship. If the second controller is faulty, the first controller may detect that the second controller is faulty. For example, the first controller may detect, using a heartbeat detection mechanism, that the second controller is faulty. When detecting that the second controller is faulty, the first controller determines that the link corresponding to the first port is faulty.

Step S702. The first controller updates bound port group information.

The updating bound port group information includes changing a working status of the first port to unavailable, and further changing a status of the link corresponding to the first port to faulty. Optionally, the first controller generates a node status change event when detecting that the second controller is faulty. The node status change event is used to indicate that the second controller is faulty. When updating the bound port group information, the first controller may change, according to the node status change event, the working status of the first port to unavailable, and change the status of the link corresponding to the first port to faulty.

Step S703. (Optional) The first controller notifies another controller in a bound port group that the link of the first port is faulty.

Step S704. (Optional) The other controller updates locally stored bound port group information.

In this embodiment, steps S703 and S704 are optional steps. Further, if the bound port group information is globally stored, only the first controller needs to perform updating, and steps S703 and S704 do not need to be performed, or if the bound port group information is locally stored by a controller to which each attached port in the bound port group belongs, steps S703 and S704 are performed. The second controller is a faulty controller, the other controller is a controller, other than the first controller and the second controller, that is not faulty in the bound port group, and there may be one or more other controllers. The first controller notifies the other controller that the link of the first port is faulty. For example, the first controller may send a link change event to the other controller, and the link change event is used to indicate that the link of the first port is faulty.

The other controller changes, in the locally stored bound port group information according to the link change event, the working status of the first port to unavailable, and changes the status of the link corresponding to the first port to faulty.

Step S705. The first controller selects a second port from the bound port group.

Step S706. The first controller hands over a service carried on the link of the first port to a link of the second port.

Step S707. The first controller updates link service information.

A processing process in step S705 to step S707 is the same as content described in a method for selecting the second port and updating of the link service information in step S505 to step S507, and details are not described herein again.

In this embodiment, the bound port group includes a plurality of ports from different controllers. When a controller is faulty, the second port that is in an available working state may be selected from the bound port group, to carry the service carried on the first port, and the second port belongs to the other controller, thereby improving service reliability of an entire storage system.

In conclusion, in scenarios of a fault of any port in the bound port group, a fault of an interface card to which the any port belongs, a fault of a switch side port connected to the any port, and a fault of a controller to which the any port belongs, according to the method provided in this embodiment of the present disclosure, a port that is in an available state may be selected from the bound port group, to carry a service of the port, thereby improving reliability of the entire storage system.

It should be noted that, for brief description, the foregoing method embodiments are represented as a series of actions. However, a person skilled in the art should know that the present disclosure is not limited by the described action sequence. In addition, the person skilled in the art should also understand that all the embodiments described in the specification are embodiments, and the related actions are not necessarily required by the present disclosure.

Another proper step combination that can be figured out by a person skilled in the art according to the foregoing described content shall also fall within the protection scope of the present disclosure. In addition, the person skilled in the art should also know that all the embodiments described in the specification are preferred embodiments, and the related actions are not necessarily required by the present disclosure.

The link handover method for a service in a storage system according to the embodiments of the present disclosure is described above in detail with reference to FIG. 1A to FIG. 7, and a storage device of a service link in a storage system according to the embodiments of the present disclosure is described below in detail with reference to FIG. 8 and FIG. 9.

Figure 8:
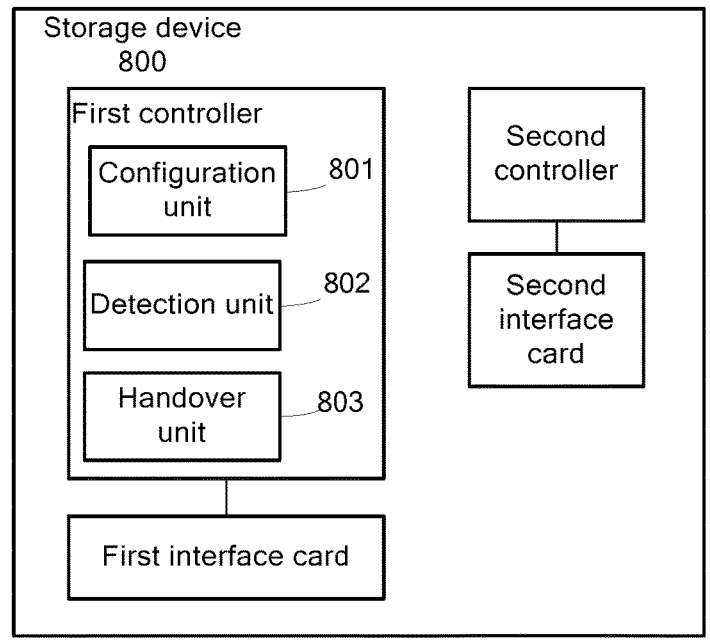
FIG. 8 is a schematic structural diagram of a storage device according to an embodiment of the present disclosure.

FIG. 8 shows a storage device 800 according to an embodiment of the present disclosure. The storage device includes a first controller and a second controller. The first controller and the second controller are respectively connected to a first interface card and a second interface card, and the first interface card and the second interface card each include at least one port. The first controller includes a configuration unit 801, a detection unit 802, and a handover unit 803.

The configuration unit 801 is configured to preconfigure a bound port group, where the bound port group includes ports from the first controller and the second controller.

The detection unit 802 is configured to mark a status of a first port as unavailable when detecting that a link of the first port is faulty.

The handover unit 803 is configured to select a second port that is in an available state from the bound port group, and hand over a service carried on the link of the first port to a link of the second port.

Optionally, when the first port belongs to the first controller, if the detection unit 802 detects that the first port is faulty or detects that an interface card to which the first port belongs is faulty, the detection unit 802 determines that the link of the first port is faulty.

Optionally, when the first port belongs to the first controller, the detection unit 802 is further configured to determine that the link of the first port is faulty when the first controller receives no link status information from a peer switch within a predefined time threshold.

Optionally, when the first port belongs to the second controller, the detection unit 802 is further configured to determine that the link of the first port is faulty when detecting that the second controller is faulty.

The handover unit 803 may select the second port that is in an available state from the bound port group with reference to the rule described in the method embodiment shown in FIG. 4, and details are not described herein again.

It should be understood that the storage device 800 according to this embodiment of the present disclosure may correspondingly perform the method 400 in the embodiment of the present disclosure, and the foregoing and other operations and/or functions of the units in the storage device 800 are intended to implement corresponding procedures of the methods in FIG. 1A to FIG. 7. For brevity, details are not described herein again.

According to the foregoing descriptions of the foregoing storage device, in scenarios of a fault of any port in the bound port group, a fault of an interface card to which the any port belongs, a fault of a switch side port connected to the any port, and a fault of a controller to which the any port belongs, the storage device provided in this embodiment of the present disclosure may select a link corresponding to a port that is in an available state from the bound port group to carry a service, thereby improving reliability of a storage system.

Figure 9:
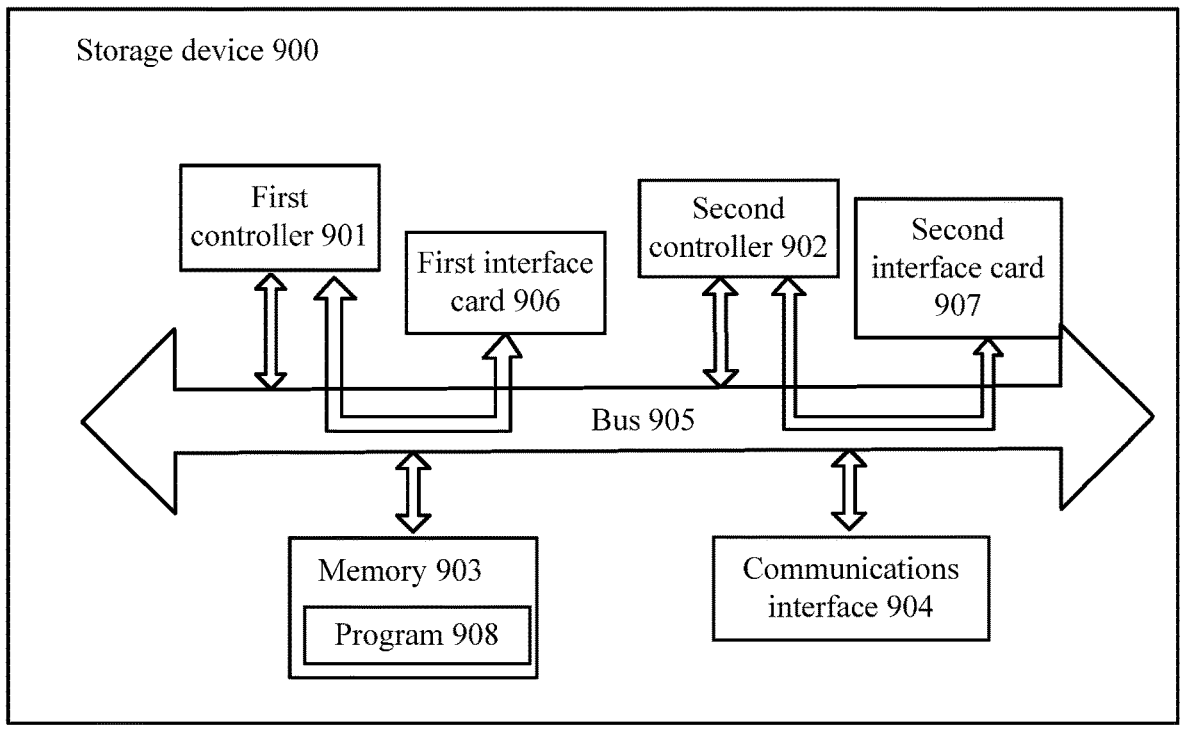
FIG. 9 is a schematic structural diagram of another storage device according to an embodiment of the present disclosure.

FIG. 9 is a schematic diagram of a storage device 900 according to an embodiment of the present disclosure. As shown in FIG. 9, the storage device 900 includes a first controller 901, a second controller 902, a memory 903, a communications interface 904, and a bus 905. The first controller 901 communicates with at least one first interface card 906 using the bus 905, the second controller communicates with at least one second interface card 907 using the bus 905, and the first interface card 906 and the second interface card 907 each include at least one port. The first controller 901, the second controller 902, the memory 903, and the communications interface 904 implement mutual communication using the bus 905.

The first controller 901 or the second controller 902 may be a general purpose central processing unit (CPU), a microprocessor, an application-specific integrated circuit (ASIC), or one or more integrated circuits, and is configured to execute a related program to implement the technical solutions provided in the foregoing method embodiments of the present disclosure.

The memory 903 may be a read-only memory (ROM), a static storage device, a dynamic storage device, or a random access memory (RAM). The memory 903 may store an operating system and a program 908. The program 908 is program code used to implement any optional technical solution provided in the foregoing method embodiments of the present disclosure, and is executed by the first controller 901.

A system embodiment basically corresponds to a method embodiment. For related parts, refer to the parts in the method embodiment. The described system embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The present disclosure can be described in the general context of executable computer instructions executed by a computer, for example, a program module. Generally, the program module includes a routine, a program, an object, a component, a data structure, and the like for executing a particular task or implementing a particular abstract data type. The present disclosure may also be practiced in distributed computing environments in which tasks are performed by remote processing devices that are connected by a communications network. In a distributed computing environment, program modules may be located in both local and remote computer storage media including storage devices.

A person of ordinary skill in the art may understand that all or some of the steps of the method embodiments may be implemented by program instructing relevant hardware. The program may be stored in a computer readable storage medium, such as a ROM, a RAM, a magnetic disk, or an optical disc.

It should be noted that in this specification, relational terms such as first and second are only used to distinguish one entity or operation from another, and do not necessarily require or imply that any actual relationship or sequence exists between these entities or operations. In addition, the terms "include," "contain," or their any other variant is intended to cover a non-exclusive inclusion such that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

In short, the foregoing descriptions are merely example embodiments of the present disclosure, but are not intended to limit the protection scope of the present disclosure. Specific examples are used in this specification to describe the principle and implementations of the present disclosure. The descriptions of the foregoing embodiments are merely intended to help understand the method and core idea of the present disclosure. In addition, a person of ordinary skill in the art may, according to the idea of the present disclosure, make modifications with respect to the specific implementations and the application scope. Therefore, the content of this specification shall not be construed as a limitation to the present disclosure. Any modification, equivalent replacement, or improvement made without departing from the spirit and principle of the present disclosure shall fall within the protection scope of the present disclosure.

What is claimed is:

1. A link handover method implemented by a first controller for a service in a storage system comprising the first controller and a second controller, wherein the method comprises:
    detecting that a link of a first port in a bound port group is faulty;
    marking a status of the first port as unavailable when the first controller detects that the link of the first port is faulty, wherein the first controller and the second controller communicate with a single switch, wherein the first controller and the second controller are each coupled to at least one interface card, wherein each interface card comprises at least one port, wherein the bound port group is preconfigured in the storage system, and wherein the bound port group comprises ports from the first controller and the second controller;
    selecting a second port in an available state from the bound port group; and
    handing over a service carried on the link of the first port to a link of the second port.

2. The method of claim 1, wherein the first port belongs to the first controller.

3. The method of claim 1, wherein the first port belongs to the first controller, and wherein detecting that the link of the first port is faulty comprises determining that the link of the first port is faulty when the first controller does not receive link status information from a peer switch within a predefined time threshold.

4. The method of claim 1, wherein the first port belongs to the second controller, and wherein detecting that the link of the first port is faulty comprises determining that the link of the first port is faulty when the first controller detects that the second controller is faulty.

5. The method of claim 1, wherein selecting the second port comprises randomly selecting a port currently in the available state from the bound port group as the second port.

6. The method of claim 1, wherein selecting the second port comprises selecting, from the bound port group, a port currently in the available state and belonging to a same interface card as the first port.

7. The method of claim 1, wherein the first controller and the second controller belong to a same storage device.

8. The method of claim 1, wherein the first controller and the second controller to different storage devices.

9. The method of claim 1, wherein the first port belongs to the first controller, and wherein detecting that the link of the first port is faulty comprises determining that the link of the first port is faulty when the first controller detects that an interface card to which the first port belongs is faulty.

10. The method of claim 1, wherein selecting the second port comprises selecting a port currently in the available state that belongs to a same controller as the first port when the bound port group currently has no port in the available state that belongs to a same interface card as the first port.

11. The method of claim 1, wherein selecting the second port comprises selecting a port currently in the available state that has lightest service load from the bound port group as the second port when the bound port group has neither a port currently in the available state that belongs to a same interface card as the first port nor a port currently in the available state that belongs to a same controller as the first port.

12. A storage device, comprising:
- a first controller coupled to at least one interface card;
- a second controller coupled to the at least one interface card, wherein the first controller and the second controller communicate with a single switch, and wherein each interface card comprises at least one port; and
- a memory coupled to the first controller and configured to store instructions, wherein the instructions cause the first controller to:
  - preconfigure a bound port group, the bound port group comprising ports from the first controller and the second controller;
  - detect that a link of the first port is faulty;
  - mark a status of a first port as unavailable when the link of the first port is faulty;
  - select a second port in an available state from the bound port group; and
  - hand over a service carried on the link of the first port to a link of the second port.

13. The storage device of claim 12, wherein the first port belongs to the first controller.

14. The storage device of claim 12, wherein the first port belongs to the first controller, and in a manner of detecting that the link of the first port is faulty, the instructions further cause the first controller to determine that the link of the first port is faulty when detecting that the first controller does not receive link status information from a peer switch within a predefined time threshold.

15. The storage device of claim 12, wherein the first port belongs to the second controller, and in a manner of detecting that the link of the first port is faulty, the instructions further cause the first controller to determine that the link of the first port is faulty when detecting that the second controller is faulty.

16. The storage device of claim 12, wherein in a manner of selecting the second port, the instructions further cause the first controller to randomly select a port currently in the available state from the bound port group as the second port.

17. The storage device of claim 12, wherein in a manner of selecting the second port, the instructions further cause the first controller to select, from the bound port group, a port that is currently in an available state and belongs to a same interface card as the first port.

18. The storage device of claim 12, wherein the first port belongs to the first controller, and in a manner of detecting that the link of the first port is faulty, the instructions further cause the first controller to determine that the link of the first port is faulty when detecting that an interface card to which the first port belongs is faulty.

19. The storage device of claim 12, wherein in a manner of selecting the second port, the instructions further cause the first controller to select a port currently in the available state that belongs to a same controller as the first port when the bound port group currently has no port in the available state that belongs to a same interface card as the first port.

20. The storage device of claim 12, wherein in a manner of selecting the second port, the instructions further cause the first controller to select a port currently in the available state that has lightest service load from the bound port group as the second port when the bound port group has neither a port currently in the available state that belongs to a same interface card as the first port nor a port currently in the available state that belongs to a same controller as the first port.

* * * * *